(12) United States Patent
Frias

(10) Patent No.: US 9,140,279 B2
(45) Date of Patent: Sep. 22, 2015

(54) MAGNETIC MOUNT

(71) Applicant: Samuel Dale Frias, Lake Elsinore, CA (US)

(72) Inventor: Samuel Dale Frias, Lake Elsinore, CA (US)

(73) Assignee: The Young Engineers, Inc., Lake Forest, CA (US)

( * ) Notice: Subject to any disclaimer, the term of this patent is extended or adjusted under 35 U.S.C. 154(b) by 0 days.

(21) Appl. No.: 13/626,262

(22) Filed: Sep. 25, 2012

(65) Prior Publication Data

US 2014/0084119 A1    Mar. 27, 2014

(51) Int. Cl.
| | |
|---|---|
| *F16B 5/01* | (2006.01) |
| *F16B 5/02* | (2006.01) |
| *F16B 3/00* | (2006.01) |
| *F16B 11/00* | (2006.01) |
| *F16B 1/00* | (2006.01) |

(52) U.S. Cl.
CPC ................. *F16B 5/01* (2013.01); *F16B 5/0208* (2013.01); *F16B 3/005* (2013.01); *F16B 11/006* (2013.01); *F16B 2001/0035* (2013.01); *Y10S 428/90* (2013.01); *Y10T 403/56* (2015.01)

(58) Field of Classification Search
CPC .......................................................... F16B 5/01
USPC ............. 248/205.3, 205.4, 206.5, 309.4, 467, 248/537, 683; 24/303; 244/118.5, 118.1, 244/129.1, 131
See application file for complete search history.

(56) References Cited

U.S. PATENT DOCUMENTS

| | | | | |
|---|---|---|---|---|
| 346,452 | A | | 8/1886 | Baker |
| 876,912 | A | | 1/1908 | Pike |
| 1,295,868 | A | | 3/1919 | Dodds |
| 1,410,004 | A | | 3/1922 | Dodds |
| 1,811,736 | A | | 6/1931 | Bezel |
| 1,864,080 | A | | 6/1932 | Madge |
| 2,429,103 | A | | 10/1947 | Mitchell |
| 2,521,885 | A | * | 9/1950 | Vasquez ..................... 292/251.5 |
| 2,631,048 | A | | 3/1953 | Palmer |
| 2,880,830 | A | | 4/1959 | Rohe |
| 2,979,335 | A | * | 4/1961 | Pruitt ............................. 473/285 |
| 2,991,816 | A | | 7/1961 | Harbison |
| 3,009,746 | A | | 11/1961 | Haushalter |
| 3,058,765 | A | | 10/1962 | Thomas |
| 3,111,736 | A | * | 11/1963 | Budreck ......................... 24/303 |
| 3,177,916 | A | | 4/1965 | Rosan |
| 3,181,850 | A | | 5/1965 | Bajer |
| 3,245,165 | A | * | 4/1966 | Podoloff ......................... 40/591 |
| 3,258,285 | A | * | 6/1966 | Smith ........................ 292/251.5 |
| 3,262,480 | A | | 7/1966 | Storch |
| 3,265,107 | A | | 8/1966 | Glicksman |

(Continued)

FOREIGN PATENT DOCUMENTS

| | | |
|---|---|---|
| DE | 1 500 949 | 1/1970 |
| DE | 10117562 A1 * | 10/2002 |

(Continued)

OTHER PUBLICATIONS

Woodpeckers, Steel Cup Magnet, www.woodpeck.com/steelcupmagnet.html, Jul. 13, 2006.*

*Primary Examiner* — Jonathan Liu
*Assistant Examiner* — Chiedu Chibogu
(74) *Attorney, Agent, or Firm* — Joseph E. Mueth

(57) ABSTRACT

A panel insert comprising an external body having an open end, said body having a central bore, a magnet received in said bore and having a smooth surface facing said open end of the body, said magnet being affixed to said body.

2 Claims, 6 Drawing Sheets

(56) References Cited

U.S. PATENT DOCUMENTS

| | | | |
|---|---|---|---|
| 3,282,015 A | 11/1966 | Rohe et al. | |
| 3,289,724 A | 12/1966 | Ernest | |
| 3,302,566 A * | 2/1967 | Blanchet | 101/405 |
| 3,339,609 A | 9/1967 | Cushman | |
| 3,388,627 A | 6/1968 | Tinnerman | |
| 3,392,225 A | 7/1968 | Phelan | |
| 3,429,598 A | 2/1969 | Scheublein et al. | |
| 3,434,261 A | 3/1969 | Rohe | |
| 3,445,559 A | 5/1969 | Siteman | |
| 3,468,212 A | 9/1969 | Tinnerman | |
| 3,520,342 A | 7/1970 | Scheffer | |
| 3,635,272 A | 1/1972 | Scheffer | |
| 3,729,040 A | 4/1973 | Whiteside | |
| 3,742,808 A | 7/1973 | Trembley | |
| 3,964,531 A | 6/1976 | Schenk | |
| 4,069,864 A | 1/1978 | Novoryta et al. | |
| 4,092,078 A | 5/1978 | Klotz et al. | |
| 4,117,261 A | 9/1978 | Blevins | |
| 4,126,170 A | 11/1978 | DeHaitre | |
| 4,248,285 A | 2/1981 | Flaig | |
| 4,397,437 A | 8/1983 | Madej | |
| 4,480,361 A * | 11/1984 | Morita | 24/303 |
| 4,480,596 A * | 11/1984 | Shumiyashu | 600/15 |
| 4,488,844 A | 12/1984 | Baubles | |
| 4,509,308 A | 4/1985 | Dettfurth et al. | |
| 4,577,450 A * | 3/1986 | Large | 52/787.12 |
| 4,679,958 A | 7/1987 | Mizusawa et al. | |
| 4,689,928 A | 9/1987 | Dutton et al. | |
| 4,725,159 A | 2/1988 | Wood, Jr. | |
| 4,761,860 A | 8/1988 | Krauss | |
| 4,812,193 A * | 3/1989 | Gauron | 156/293 |
| 4,815,920 A | 3/1989 | Morooka | |
| 4,817,264 A | 4/1989 | Worthing | |
| 4,822,224 A * | 4/1989 | Carl et al. | 411/82.5 |
| 4,846,612 A | 7/1989 | Worthing | |
| 4,872,903 A | 10/1989 | Periou | |
| 4,880,343 A | 11/1989 | Matsumoto | |
| 4,883,399 A | 11/1989 | MacLean | |
| 4,887,950 A | 12/1989 | Sakayori | |
| 4,902,180 A * | 2/1990 | Gauron | 411/82.1 |
| 4,973,208 A | 11/1990 | Gauron | |
| 4,981,735 A | 1/1991 | Rickson | |
| 5,069,431 A | 12/1991 | Kakimoto et al. | |
| 5,092,550 A | 3/1992 | Bettini | |
| 5,141,203 A | 8/1992 | Baker et al. | |
| 5,143,456 A | 9/1992 | Jordens et al. | |
| 5,146,668 A | 9/1992 | Gulistan | |
| 5,154,530 A | 10/1992 | Dresselhouse | |
| 5,158,269 A | 10/1992 | Hein et al. | |
| 5,230,580 A | 7/1993 | Henkel | |
| 5,248,134 A | 9/1993 | Ferguson et al. | |
| 5,261,748 A | 11/1993 | Kameda | |
| 5,266,258 A | 11/1993 | Martin | |
| 5,295,671 A | 3/1994 | Nakagaki et al. | |
| 5,378,099 A | 1/1995 | Gauron | |
| 5,405,004 A * | 4/1995 | Vest et al. | 206/350 |
| 5,432,986 A * | 7/1995 | Sexton | 24/303 |
| 5,540,514 A | 7/1996 | Demars et al. | |
| 5,553,984 A | 9/1996 | Smith | |
| 5,603,472 A * | 2/1997 | Hutter, III | 244/132 |
| 5,632,582 A | 5/1997 | Gauron | |
| 5,655,758 A | 8/1997 | Hadano et al. | |
| 5,711,100 A * | 1/1998 | Elmer | 40/592 |
| 5,713,706 A | 2/1998 | Lozano | |
| 5,746,411 A | 5/1998 | Bruas et al. | |
| 5,779,413 A | 7/1998 | Cosenza | |
| 5,876,023 A | 3/1999 | Hain et al. | |
| 5,876,024 A | 3/1999 | Hain | |
| 6,065,742 A | 5/2000 | Whiteford | |
| 6,102,610 A | 8/2000 | Palusis et al. | |
| 6,138,980 A | 10/2000 | Farbotnik | |
| 6,216,833 B1 | 4/2001 | Lefferts et al. | |
| 6,227,751 B1 | 5/2001 | Kemmer et al. | |
| 6,264,412 B1 | 7/2001 | Nakamura et al. | |
| 6,287,064 B1 | 9/2001 | Jhumra | |
| 6,305,656 B1 * | 10/2001 | Wemyss | 248/309.4 |
| 6,328,513 B1 | 12/2001 | Niwa et al. | |
| 6,343,889 B1 | 2/2002 | Hendricks et al. | |
| 6,382,865 B1 | 5/2002 | Paxman | |
| 6,394,432 B1 | 5/2002 | Whiteford | |
| 6,443,679 B1 | 9/2002 | Schwarz | |
| 6,481,943 B2 | 11/2002 | Coudrais et al. | |
| 6,588,820 B2 | 7/2003 | Rice | |
| 6,594,871 B2 * | 7/2003 | Hoffman | 24/303 |
| 6,695,295 B2 | 2/2004 | Williams | |
| 6,715,746 B2 | 4/2004 | Bachmeyer et al. | |
| 6,748,820 B2 | 6/2004 | Ruhlander | |
| 6,789,993 B2 | 9/2004 | Ozawa et al. | |
| 6,910,670 B2 | 6/2005 | Kato | |
| 7,048,487 B2 | 5/2006 | Stone | |
| 7,052,002 B2 | 5/2006 | Imaeda et al. | |
| 7,131,786 B2 | 11/2006 | Domange et al. | |
| 7,163,200 B2 | 1/2007 | Dickson et al. | |
| 7,179,039 B2 | 2/2007 | Schwartz et al. | |
| 7,250,003 B2 | 7/2007 | Thompson | |
| 7,261,365 B2 | 8/2007 | Dickson et al. | |
| 7,275,347 B2 | 10/2007 | Hayes | |
| 7,465,136 B2 | 12/2008 | Nagayama | |
| 7,496,994 B1 * | 3/2009 | Headley | 24/303 |
| 7,618,013 B2 * | 11/2009 | Elmer et al. | 248/309.4 |
| 7,802,953 B2 | 9/2010 | Stephen | |
| 7,922,135 B2 * | 4/2011 | Granata | 248/206.5 |
| 8,001,661 B2 * | 8/2011 | Clark | 24/303 |
| 8,206,459 B1 * | 6/2012 | Lock et al. | 623/33 |
| RE44,480 E * | 9/2013 | Elmer | 40/592 |
| 8,568,072 B2 * | 10/2013 | Suefuji et al. | 411/34 |
| 8,739,371 B2 * | 6/2014 | Fiedler | 24/303 |
| 8,875,542 B2 * | 11/2014 | Severs | 63/40 |
| 2002/0038927 A1 | 4/2002 | Mayerbock | |
| 2002/0056953 A1 | 5/2002 | Williams | |
| 2002/0131815 A1 | 9/2002 | Bellapart | |
| 2002/0175251 A1 * | 11/2002 | Robinson et al. | 248/206.5 |
| 2004/0265091 A1 | 12/2004 | Cheung | |
| 2006/0137294 A1 | 6/2006 | Waits, Jr. et al. | |
| 2008/0014043 A1 * | 1/2008 | Zasloff | 411/41 |
| 2008/0227379 A1 * | 9/2008 | Hung | 454/184 |
| 2008/0253859 A1 | 10/2008 | Johnson | |
| 2010/0008104 A1 | 1/2010 | Rosenthal | |
| 2010/0034625 A1 * | 2/2010 | Kim | 414/226.01 |
| 2010/0086377 A1 | 4/2010 | Loret de Mola | |
| 2010/0192631 A1 * | 8/2010 | Richmond | 63/23 |
| 2011/0001025 A1 * | 1/2011 | Fiedler | 248/206.5 |
| 2011/0308048 A1 * | 12/2011 | Raccah | 24/303 |
| 2013/0276269 A1 * | 10/2013 | Su | 24/303 |

FOREIGN PATENT DOCUMENTS

| | | | | |
|---|---|---|---|---|
| EP | 273515 A1 * | 7/1988 | | |
| GB | 1056797 A * | 1/1967 | | |
| GB | 1 392 095 A | 4/1975 | | |
| GB | 2366832 A * | 3/2002 | | H01F 7/02 |
| JP | 3140612 A | 6/1991 | | |
| JP | 2003113825 A | 4/2003 | | |

* cited by examiner

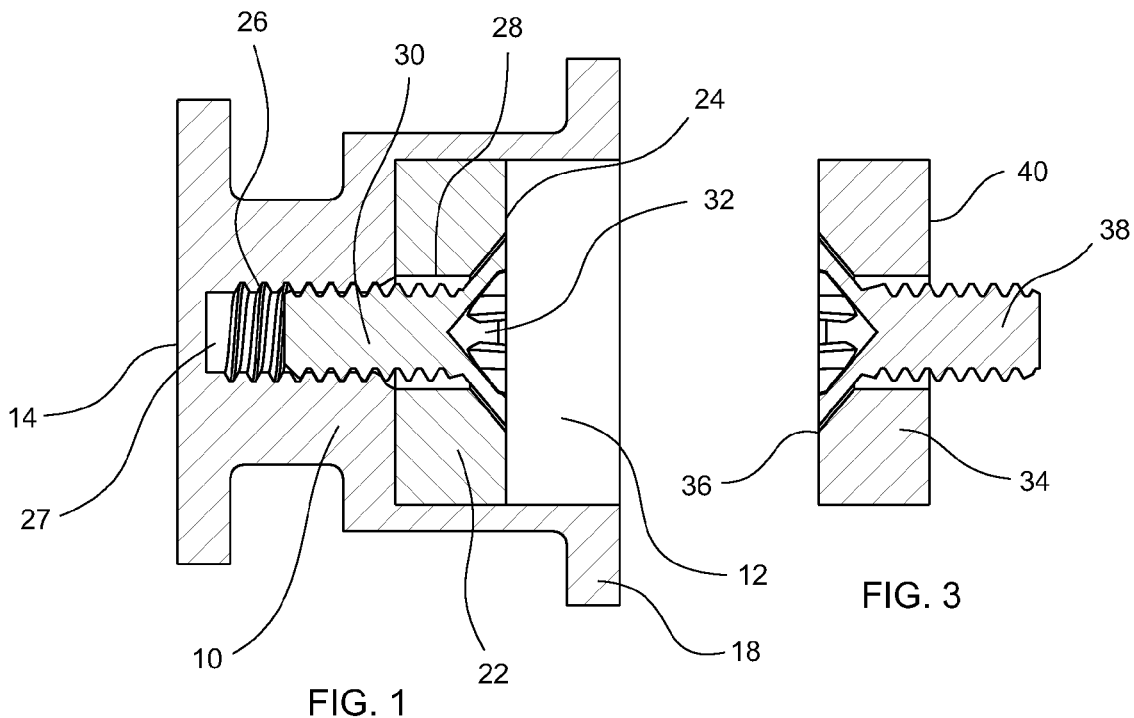
FIG. 1
FIG. 3
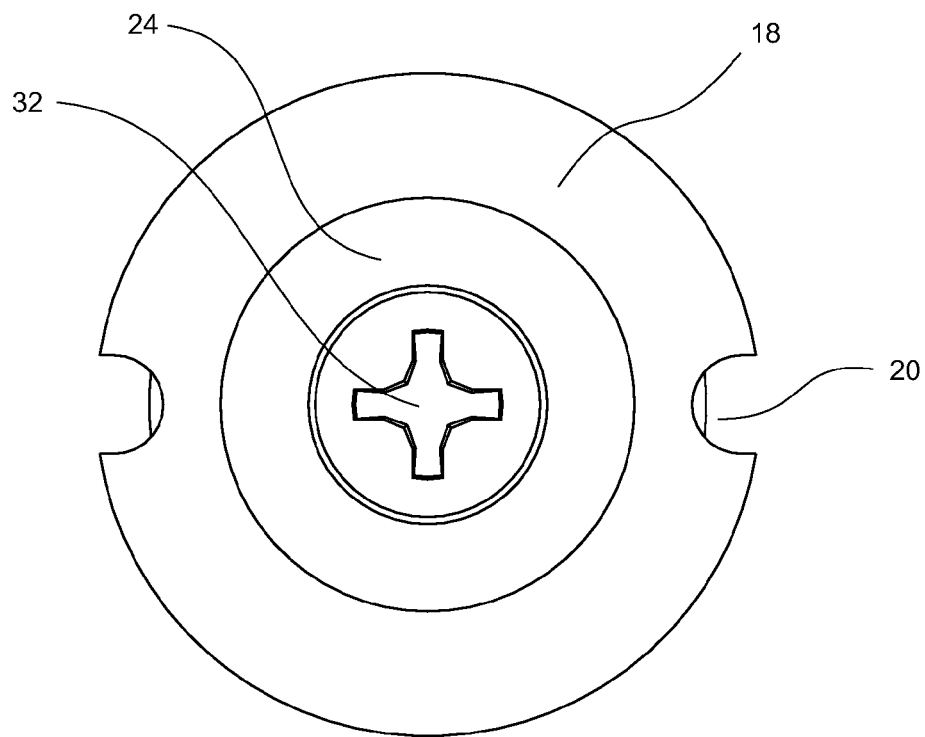
FIG. 2

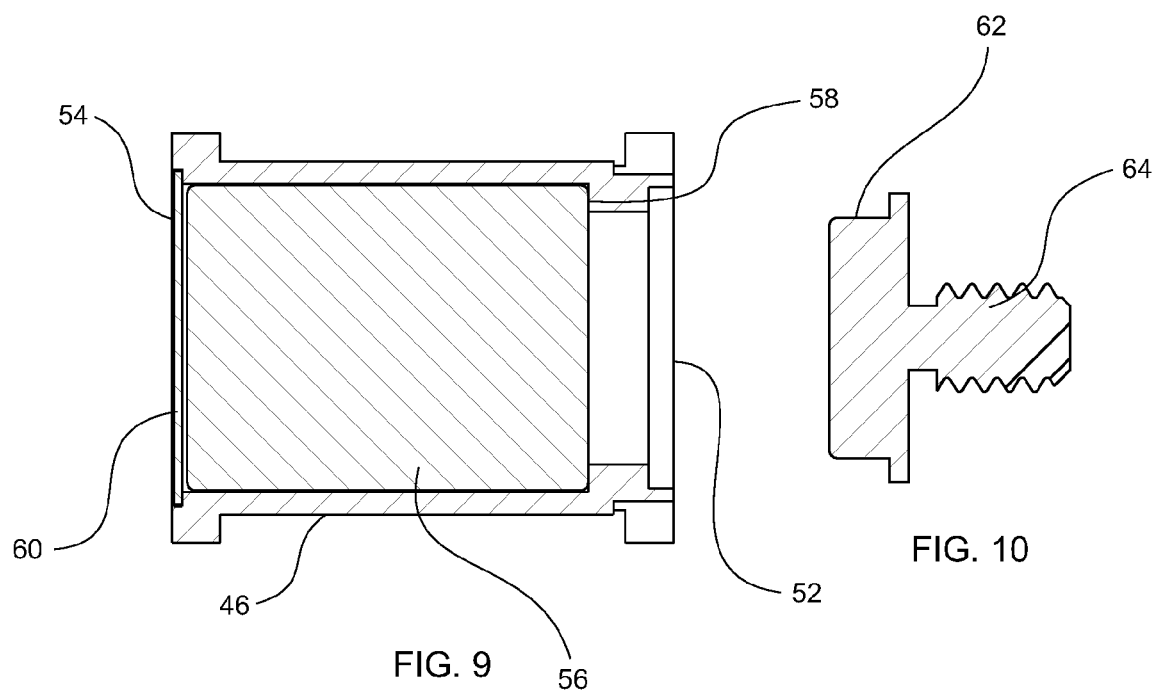
FIG. 9
FIG. 10
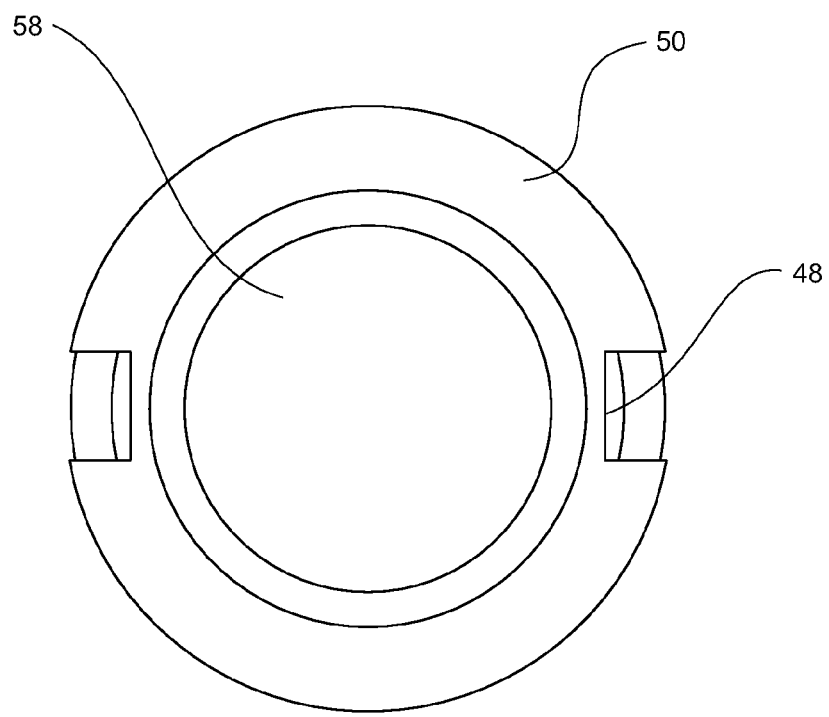
FIG. 8

MAGNETIC MOUNT

The invention relates to magnetic temporary attachment of devices such as a phone, artwork and the like to the interior paneling of an aircraft.

BACKGROUND OF THE INVENTION

Honeycomb panel is used for partitions and other interior structures in commercial aircraft. Various devices must be attached to the honeycomb panel. In order to provide attachment points, potted inserts have long been installed in honeycomb panel.

An example of a potted insert and a method for its installation in honeycomb panel is illustrated in Gauron, U.S. Pat. No. 4,812,493, FIGS. 1 to 12. These inserts have a female thread center bore adapted to receive a male thread fastener. The threaded connection is intended to secure the attached device to the panel in a way which is resistant to unauthorized manipulation and the effects of vibration. Detachment is intended to require the use of a tool. However, this threaded connection is not suitable where it is desired that the device be temporarily and securely held while at the same time being manually, repeatedly attachable and detachable from the panel. The present invention addresses this need.

The present invention relates to a magnetic insert receptacle wherein the insert has received therein a magnet or magnetically conductive stud for the purpose of temporarily yet securing affixing an item or device to an aircraft wall, table, etc. Applications include holding logos/artwork to partition walls, keeping loose objects in the aircraft cabin, portable devices (e.g., remote controls, phones, etc.) in place during takeoff/landing/turbulence and/or for general securing of lightweight yet removable features within an aircraft, yacht, etc.

SUMMARY OF THE INVENTION

A panel insert comprising an external body, preferably generally cylindrical, having at least one open end, said body having a central bore, a magnet received in said bore and having a smooth surface facing an open end of the body, said magnet being secured in the central bore of said body.

A panel insert comprising an external body having a closed end and an open end, said body having a central bore terminating at said open end, a magnet received in said bore and having a smooth surface facing said open end of the body, said magnet being affixed in the central bore of said body.

A panel insert comprising an external body having a closed end and an open end, said body having a central bore terminating at said open end, a first magnet received in said bore and having a smooth surface facing said open end of the body, said magnet being affixed in said bore, a second magnet of opposite polarity received in the open end of said body, said magnet having a surface adapted to snugly abut the smooth surface of said first magnet.

A panel insert comprising an external body having a closed end and an open end, said body having a generally cylindrical central bore extending from said closed end and terminating at said open end, a disk-like flange extending around said open end of said body such that when the insert is mounted in a panel, the flange is flush with the surface of the panel, said disk having space apart openings for receiving potting material and the venting of air, a female threaded central opening in said closed end of the body, a magnet received in said bore and having a smooth surface facing the open end of said body, a hole extending through the center of said magnet, and a male thread fastener received in said female threaded central opening to affix said magnet to said body, said male thread fastener having a head which is received flush with the surface of the magnet facing said open end of said body.

A panel insert comprising an external body having a closed end and an open end, said body having a generally cylindrical central bore extending from said closed end and terminating at said open end, a disk-like flange extending around said open end of the body such that when the insert is mounted in a panel, the flange is flush with the surface of the panel, said disk having spaced apart openings for receiving potting material and the venting of air, a female threaded central opening in said closed end of the body, a first magnet received in said bore and having a smooth surface facing the open end of said body, a hole extending through the center of said magnet, and a male thread fastener received in said female threaded central opening to affix said first magnet to said body, said male thread fastener having a head which is received flush with the surface of the magnet facing said open end of said body, a second magnet of opposite polarity received in said open end of said body and having a complementary smooth surface abutting the said smooth surface of said first magnet to permit said second magnet to be repeatedly, manually attached and detached from said first magnet.

A panel insert comprising an external body having a closed end and an open end, said body having a generally cylindrical central bore extending from said closed end and terminating at said open end, a disk-like flange extending around said open end of the body such that when the insert is mounted in a panel, the flange is flush with the surface of the panel, said disk having spaced apart openings for receiving potting material and the venting of air, a female threaded central opening in said closed end of the body, a first magnet received in said bore and having a smooth surface facing the open end of said body, a hole extending through the center of said magnet, and a male thread fastener received in said female threaded central opening to affix said first magnet to said body, said male thread fastener having a head which is received flush with the surface of the magnet facing said open end of said body, a body of ferromagnetic material received in said open end of said body and having a complementary smooth surface abutting the said smooth surface of said magnet to permit said ferromagnetic body to be repeatedly attached and detached from said magnet.

The second magnet or the ferromagnetic body is affixed to a device such as artwork, logos, a remote control or phone. The first magnet can be affixed to the panel insert body so that its exposed surface is flush with the flange of the insert and the adjacent surface of the panel. In this case, the second magnet or the body of ferromagnetic material can be simply laid on the smooth exposed surface of the magnet affixed to the insert body. The device itself (artwork logo or phone) can be made to have magnetic or ferromagnetic properties, wholly or by an attachment, which allow them to be repeatedly attachably and detachably held by the magnet affixed to the panel insert.

THE DRAWINGS

Turning to the drawings:

FIG. 1 is a longitudinal sectional view of a preferred embodiment of the insert of this invention with the first magnet in place and held by a male thread fastener.

FIG. 2 is a top view of the insert panel fastener of FIG. 1.

FIG. 3 shows one embodiment of the second magnet which can be used with the insert of FIGS. 1 and 2.

FIG. 8 is a top view of another alternate preferred embodiment of an insert wherein there is only one magnet, that being within the insert, a body of a ferromagnetic material is repeatedly attachable and detachable from said magnet due to magnetic attraction being said magnet and said ferromagnetic bodies.

FIG. 9 is a side view in half-section showing the insert of FIG. 8.

FIG. 10 is a full sectional view of the insert of FIGS. 8 and 9 together with a member made of a ferromagnetic material such as carbon steel or stainless steel which can be held by a magnet. A device is intended to be attached to said non-magnetic member.

DESCRIPTION OF THE PREFERRED EMBODIMENTS

Figure 4:
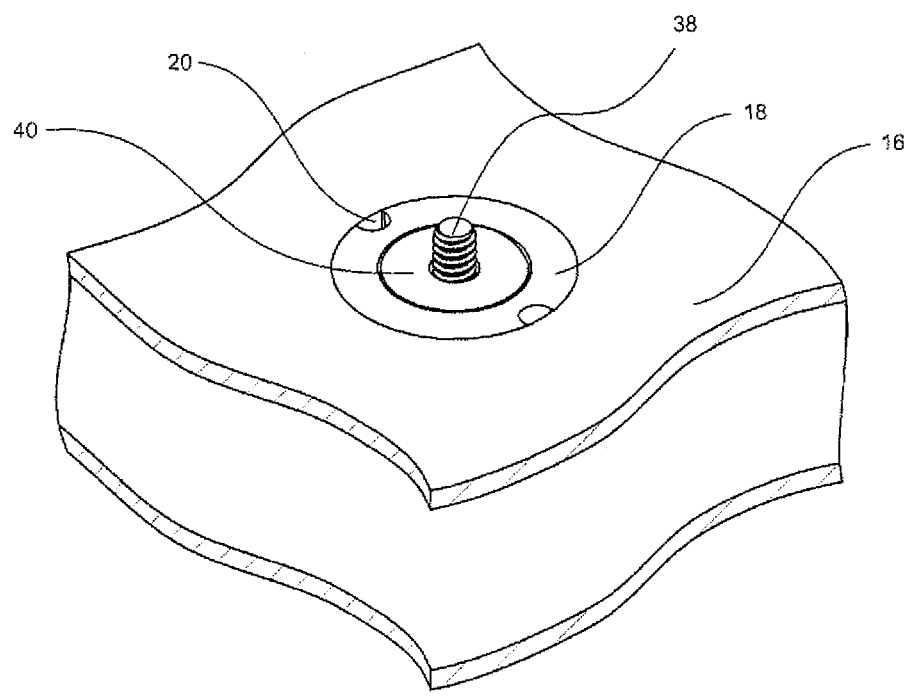
FIG. 4 shows the insert of FIGS. 1 and 2 and the second magnet of FIG. 3 after it has been installed in a panel.
Figure 5:
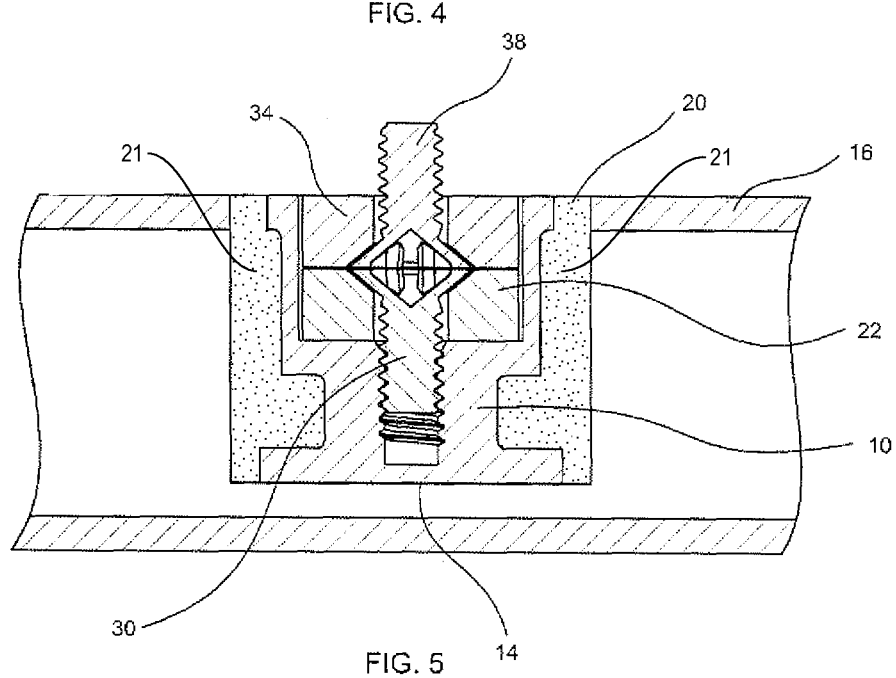
FIG. 5 shows in sectional view the insert of FIG. 1 with the second magnet of FIG. 3 magnetically retained therein.

The first magnet 22 inside the body 10 is securely attached to the body by a screw 30 as is shown in FIGS. 1 and 2.

FIG. 3 shows the second magnet 34 which when inserted into the body is attachably and detachably held by the magnet 22 in the body. The two magnets are of opposite polarity. The central threaded element 38 in FIG. 3 is an attachment point for the remote control or phone, etc., and can be replaced by adhesive if use of a screw would damage the remote control or phone.

Turning to the drawings in more detail, the insert body 10 has a generally cylindrical open end 12 and a closed end 14, and is adapted to be received in honeycomb sandwich panel 16. The body 10 has a circular flange 18 projecting from open end 12. The flange 18 preferably has spaced apart, preferably diametrically opposed, cutouts or holes 20, one for the introduction of potting material 21, and the other for the venting of air. The method of potting inserts in honeycomb panel and the installation of inserts so that the flange 18 is flush with the adjacent surface of the honeycomb panel is familiar to those skilled in the art.

A cylindrical first magnet 22 having a generally smooth flat outer surface 24 facing the open end of body 10 is snugly received in the open end 12.

A female thread 26 is centrally disposed in opening 27 which extends into the closed end 14 of body 10, stopping short of the terminus of the closed end.

The first magnet 22 has a centrally disposed countersunk threaded clearance hole 28 that allows the male threaded fastener 30 to mate with the female threads 26 in insert body 10.

A male thread fastener 30 is received in thread 26 to secure the magnet 22 to insert body 10. The male thread fastener 30 has a head 32 which is received in the surface 24 of magnet 22 to form a surface which is flush with surface 24, as shown in FIG. 1.

Once the insert with the first magnet has been installed in a panel, a second magnet 34 of opposite polarity to magnet 22, having a smooth surface 36, preferably of approximately the same diameter as magnet 22, can be inserted and magnetically retained in the open end 12 of insert body 10. The magnetic attachment can be overcome by ordinary manual force, so the attachment and detachment of the two magnets can be repeated as often as is required.

Figure 6:
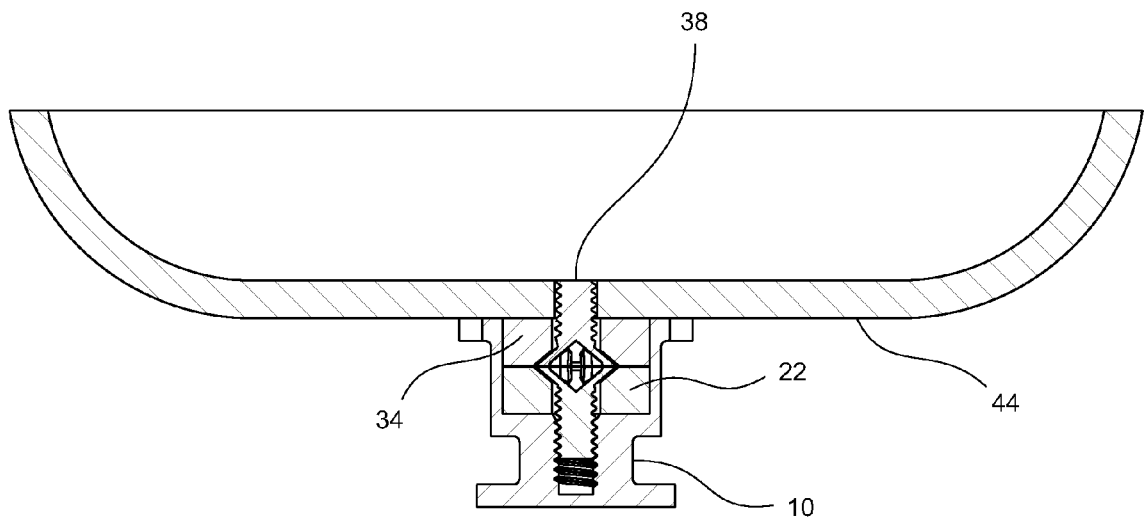
FIG. 6 is a sectional view of the insert and second magnet of FIG. 5 with a device, e.g., a cell phone housing held to the screw thread projecting from the top of the second magnet.
Figure 7:
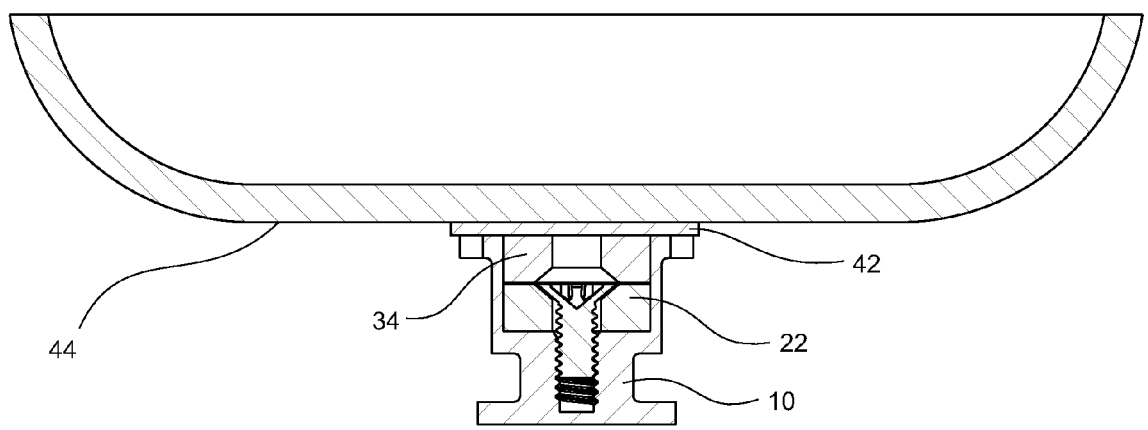
FIG. 7 is an alternate preferred embodiment wherein the screw thread projecting from the second magnet in FIG. 5 has been eliminated and the device is affixed to the second magnet by an adhesive bond.

FIGS. 6 and 7 illustrate the practical application of the invention.

The magnet 34 may have a male thread stud 38 projecting from the surface 40 opposed to its smooth surface 36.

As shown in FIG. 6, the stud 38 can be threadably attached to a device such as artwork, logos, a remote control or phone.

Alternatively, the stud 38 can be replaced by an adhesive bonding layer 42, as shown in FIG. 7.

The artwork, logos, remote control or phone is indicated generally by the casing or frame 44.

In another embodiment, the magnet 34 need not be sized to the magnet 22. Instead, the magnet 34 can be smaller and stud-like while still being held by magnet 22.

The magnet 22 need not be snugly received in the open end 12 of insert body 10. In general, magnets 22 and 34 can be of any shape so long as the facing surfaces 24 and 36 are essentially smooth to provide a close abutting relationship.

In use, the insert can be secured to the honeycomb panel by potting or any other means known in the art. The panel is preferably honeycomb. However, any type of panel normally provided with inserts may be used.

The insert can first be assembled to the first magnet 22 by screw 30 and then installed in the panel. Alternatively, the insert can be installed in the panel and the first magnet subsequently secured to the insert by screw 30.

The first magnet 22 need not be held by screw 30. Instead, the first magnet can be swagged into or adhesively bonded to the opening 12 in insert body 10.

The magnets are preferably noedymium.

The insert body 10 of the insert can be steel, aluminum, stainless steel, titanium, or plastic of the types well-known in the art. The body 10 is normally non-magnetic.

In the additional alternate preferred embodiment of FIGS. 8 to 10, insert 46 has potting cutouts or holes 48 in top flange 50. The interior of insert 46 has an opening 52 at the top and, initially, an opening at the opposite end 54. A magnet 56 is snugly received in insert 46. The magnet 56 can be swagged in insert 46 or, as shown in FIG. 9, the inside wall of insert 46 can be provided with an area of reduced diameter to form a projection 58. The magnet 56 is then held within the insert 46 between the projection 58 at one of its ends and the other end of magnet 56 is held by element 60 which can be a metal shim which is swagged into the interior of insert 46, securing magnet 56 in place.

In the embodiment of FIGS. 8 to 10, the second magnet is replaced by a ferromagnetic element 62, preferably made of carbon steel or stainless steel which can be attached to and held by magnet 56 and manually detached from said magnet. The ferromagnetic element 62 can be provided with a threaded stud 64. Stud 64 can be attached to devices as explained above. The stud 64 can also be eliminated and replaced by an adhesive bonding layer to adhere to a device.

Figure 11:
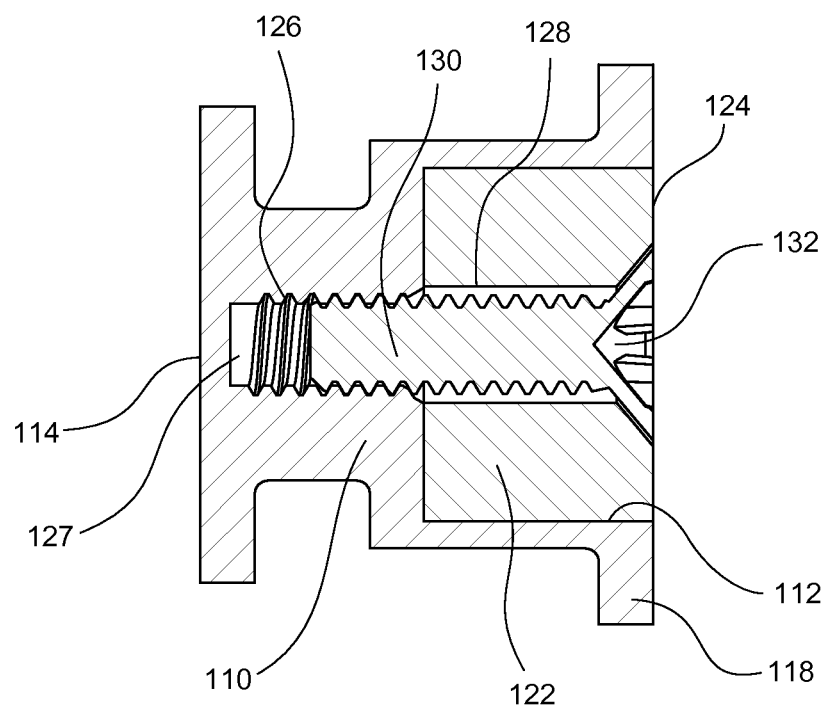
FIG. 11 is a sectional view of another embodiment of the panel insert taken along the line 11-11 in FIG. 12.
Figure 12:
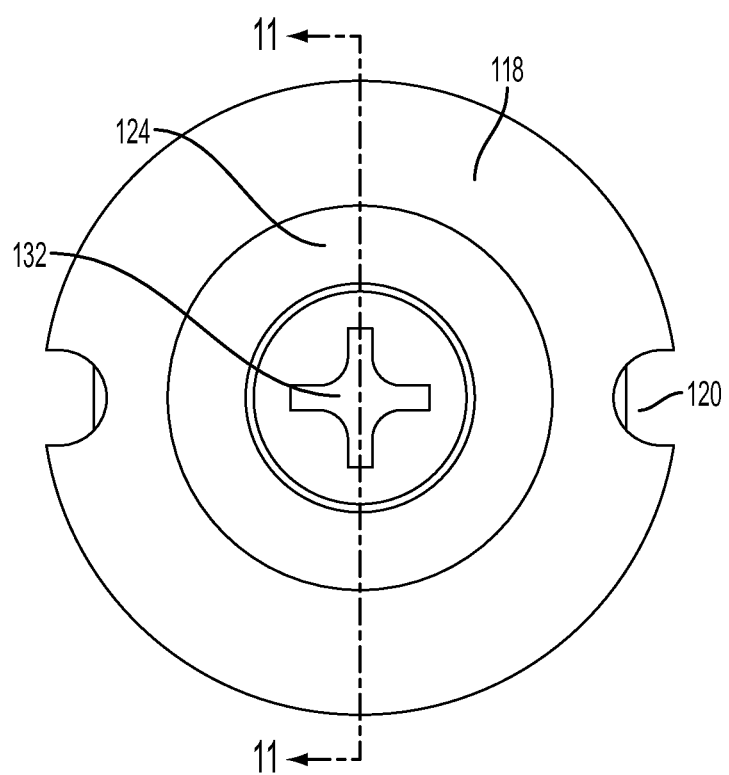
FIG. 12 is a top view of the insert of FIG. 11.

In FIGS. 11 and 12, the body 110 of the insert has a closed end 114 and an open end 112. The body 110 has a flange 118. A magnet 122 is received in the open end 112 and has a smooth surface 124. The magnet 122 is affixed in the central bore of said body 110. In the panel insert the magnetic member 122 is generally circular in cross-section and received in the central opening with said smooth surface being flush with the open end 112 of the body 110. A female thread 128 is disposed in opening 127. The magnet 122 has a center hole 128. Fastener 130 is received in thread 126 to secure magnet 122 to insert body 110. The head 132 of fastener 130 is received in the surface 124 of magnet 122 to form a surface flush with surface 124. The outer surface of magnet 122 including head 132 is flush with the surrounding flange 118.

What is claimed is:

1. A combination comprising a honeycomb panel and a panel insert, said panel insert being snugly received in a hole in said honeycomb panel and held therein by potting material, said panel insert comprising an insert body having a closed end and an open end, said insert body having a cylindrical smooth sided central bore extending from said closed end and terminating at said open end, a flange extending around said open end of the insert body, said panel insert received in said honeycomb panel with the flange being flush with the surface of the panel, said flange having spaced apart openings for receiving said potting material and the venting of air, a female threaded central opening within said closed end of the insert body, said cylindrical smooth sided central bore being larger in diameter than said female threaded central opening, a first smooth sided magnet snugly received in said smooth sided central bore and having a smooth planar circular surface facing the open end of said insert body, a hole extending through the center of said first magnet, and a male thread fastener received in said female threaded central opening affixing said first magnet to said insert body, said male thread fastener having a flat head which is received flush with the smooth planar circular surface of the first magnet facing said open end of said insert body, a smooth sided second magnet of opposite polarity snugly received in said open end of said insert body and having an exposed surface which is flush with the adjacent surface of said honeycomb panel and a complementary smooth planar circular surface abutting the said smooth planar circular surface of said first magnet to permit said second magnet to be repeatedly manually attached and detached from said first magnet.

2. The combination of claim 1 further including a device attached to the exposed surface of the second magnet.

* * * * *